(12) United States Patent
Eaves

(10) Patent No.: US 8,068,937 B2
(45) Date of Patent: Nov. 29, 2011

(54) POWER DISTRIBUTION SYSTEM WITH FAULT PROTECTION USING ENERGY PACKET CONFIRMATION

(75) Inventor: Stephen Spencer Eaves, Charlestown, RI (US)

(73) Assignee: Stephen Spencer Eaves, Charleston, RI (US)

( * ) Notice: Subject to any disclaimer, the term of this patent is extended or adjusted under 35 U.S.C. 154(b) by 353 days.

(21) Appl. No.: 12/365,842

(22) Filed: Feb. 4, 2009

(65) Prior Publication Data

US 2009/0204268 A1    Aug. 13, 2009

Related U.S. Application Data

(60) Provisional application No. 61/027,452, filed on Feb. 9, 2008.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02J 1/04 | (2006.01) |
| H02J 3/14 | (2006.01) |
| H02J 1/10 | (2006.01) |
| H02J 3/38 | (2006.01) |
| H02J 7/34 | (2006.01) |
| H01H 47/00 | (2006.01) |
| H01H 83/00 | (2006.01) |
| G05F 1/00 | (2006.01) |
| G08B 21/00 | (2006.01) |
| H02H 3/00 | (2006.01) |
| H02H 7/00 | (2006.01) |

(52) U.S. Cl. ............. 700/293; 700/298; 307/35; 307/62; 307/125; 323/220; 323/284; 340/635; 340/659; 340/661; 340/664; 361/64; 361/66; 361/79

(58) Field of Classification Search .................. 700/286, 700/291–293, 295, 297, 298; 307/18–20, 307/31, 35, 43, 52, 64, 62, 125; 323/282, 323/284, 220, 234, 265; 327/519; 340/3.43, 340/1.1, 3.1, 500, 540, 635, 657, 659, 660, 340/661, 664; 361/62–66, 79, 78
See application file for complete search history.

(56) References Cited

U.S. PATENT DOCUMENTS 4,038,559 A * 7/1977 Chun et al. ...................... 307/64
(Continued)

OTHER PUBLICATIONS

H. Hoang et al., "Electrical Network Models for Chassis Fault Current Analysis", 2005 IEEE Aerospace Conference, Publication Year: 2005, pp. 1-6.*

*Primary Examiner* — Crystal J Barnes-Bullock

(57) ABSTRACT

The disclosed power distribution system regulates the transfer of energy from a source 1 to a load 3. Source Controller 5 on the source side closes Disconnect Device 7 and monitors the transfer of a pulse or "packet" of energy to the load side. A Load Controller 9 on the load side communicates the amount of energy received at the load back to the source controller via Communication Link 11. If it is confirmed that the energy received on the load side corresponds to that sent by the source side, another energy packet is sent. If the energy received does not correspond with that sent by the source side, energy transfer is stopped, indicating a system fault or safety hazard. The energy content of a single packet is kept small, such that if it is not properly delivered, it can not cause damage to equipment or harm personnel.

21 Claims, 6 Drawing Sheets

U.S. PATENT DOCUMENTS

| | | | |
|---|---|---|---|
| 4,075,699 A * | 2/1978 | Schneider et al. | 700/291 |
| 4,206,443 A * | 6/1980 | Britton | 340/3.43 |
| 4,302,750 A * | 11/1981 | Wadhwani et al. | 340/870.02 |
| 4,316,136 A * | 2/1982 | Saxarra et al. | 323/282 |
| 4,686,630 A * | 8/1987 | Marsland et al. | 700/296 |
| 5,324,989 A * | 6/1994 | Thornton | 307/35 |
| 5,396,165 A * | 3/1995 | Hwang et al. | 323/210 |
| 5,424,894 A * | 6/1995 | Briscall et al. | 361/45 |
| 5,760,492 A * | 6/1998 | Kanoi et al. | 307/18 |
| 5,784,237 A * | 7/1998 | Velez | 361/62 |
| 6,008,971 A * | 12/1999 | Duba et al. | 361/64 |
| 6,067,482 A * | 5/2000 | Shapiro | 700/286 |
| 6,121,693 A * | 9/2000 | Rock | 307/18 |
| 6,153,943 A * | 11/2000 | Mistr, Jr. | 290/52 |
| 6,316,920 B1 * | 11/2001 | Huggett et al. | 323/207 |
| 6,331,798 B1 * | 12/2001 | O'Leary et al. | 327/470 |
| 6,392,856 B1 * | 5/2002 | Kehrli et al. | 361/64 |
| 6,636,101 B2 * | 10/2003 | Atanus et al. | 327/519 |
| 6,727,435 B1 * | 4/2004 | Egan et al. | 174/250 |
| 6,963,475 B2 * | 11/2005 | Klippel et al. | 361/79 |
| 7,009,527 B2 * | 3/2006 | Seo | 340/12.31 |
| 7,545,053 B2 * | 6/2009 | Yoshikawa et al. | 307/19 |
| 7,566,991 B2 * | 7/2009 | Blackman | 307/65 |
| 7,586,718 B1 * | 9/2009 | Radosavljevic et al. | 361/42 |
| 7,936,088 B2 * | 5/2011 | Orr et al. | 307/20 |
| 7,989,977 B2 * | 8/2011 | Crane | 307/8 |
| 2005/0141154 A1 * | 6/2005 | Consadori et al. | 361/62 |
| 2007/0285857 A1 * | 12/2007 | Berkowitz et al. | 361/64 |
| 2008/0205649 A1 * | 8/2008 | Harris et al. | 380/270 |
| 2011/0029148 A1 * | 2/2011 | Yang et al. | 700/297 |
| 2011/0031950 A1 * | 2/2011 | Hodges et al. | 323/284 |

* cited by examiner

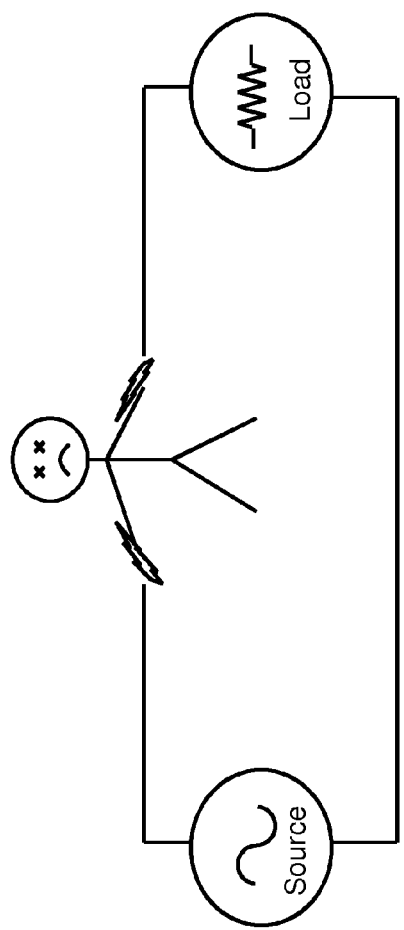
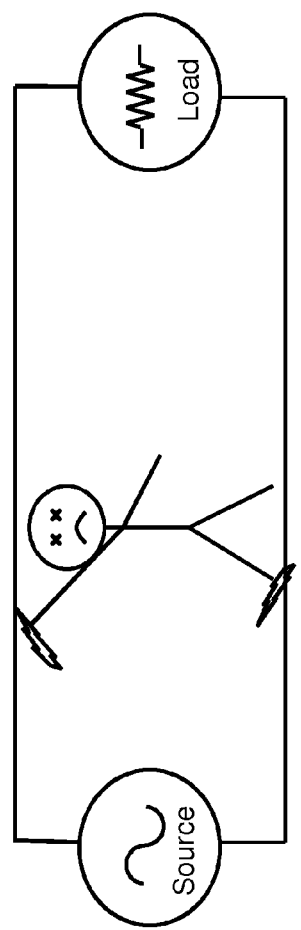
Fig. 4a
Fig. 4b

POWER DISTRIBUTION SYSTEM WITH FAULT PROTECTION USING ENERGY PACKET CONFIRMATION

CLAIM OF PRIORITY

This application claims priority to U.S. Ser. No. 61/027,452 entitled "Power Distribution System with Fault Protection using Energy Packet Confirmation", filed on Feb. 9, 2008, naming Stephen Eaves of Charlestown, R.I. as inventor, the contents of which are herein incorporated by reference in their entirety.

FIELD OF INVENTION

This invention relates to power distribution system protection devices. More specifically, power distribution systems with computerized monitoring to detect and disconnect power in the event of an electrical fault or safety hazard. This invention is applicable to general power distribution, or more specifically electric vehicle charging systems, electric railway vehicle power distribution or energized roadways for electric vehicles.

BACKGROUND

In a typical power distribution application, power from a central source is distributed through a number of branch circuits to a load device. The branch circuits are equipped with protection devices such as circuit breakers or fuses. During an electrical fault, such as a short circuit, the protection devices are designed to detect an abnormally high level of current and disconnect, or interrupt, the source from the load before causing damage or fire to the distribution system.

The introduction of the Ground Fault Interrupter (GFI) added electrocution protection to the distribution system by detecting an imbalance between phase currents in a particular branch circuit, indicating that current is flowing through an alternate ground path and possibly in the process of electrocuting an individual.

However, there are significant shortcomings in traditional distribution protection methods. For example, a fire could still occur from a loose connection. In this case, the resistance of a live connection increases and heats up to the point of igniting surrounding materials. This heat build-up could occur at electrical currents well below the trip point of the branch circuit protection devices. In the case of GFI protection, the GFI circuit can only protect an individual that comes in contact with both a line conductor and a ground point, such as would be the case if an individual touched a live electric conductor with one hand and a sink faucet with the other hand. However, if the individual manages to touch both a live conductor and a return path (such as across the "hot" and neutral conductors of a home outlet) the GFI would not activate and the person would receive a shock.

Another concept key to the background of the invention of this disclosure is a metric used to relate the lethality of an electric shock to the duration and magnitude of a current pulse flowing through the body. One metric used to describe this relationship by electrophysiologists is known as the chronaxie; a concept similar to what engineers refer to as the system time constant. Electrophysiologists determine a nerve's chronaxie by finding the minimal amount of electrical current that triggers a nerve cell using a long pulse. In successive tests, the pulse is shortened. A briefer pulse of the same current is less likely to trigger the nerve. The chronaxie is defined as the minimum stimulus length to trigger a cell at twice the current determined from that first very long pulse. A pulse length below the chronaxie for a given current will not trigger a nerve cell. The invention of this disclosure takes advantage of the chronaxie principle to keep the magnitude and duration of the energy packet to be safely below the level that could cause Electrocution.

Electrocution is the induction of a cardiac arrest by electrical shock due to ventricular fibrillation (VF). VF is the disruption of the normal rhythms of the heart. Death can occur when beating of the heart becomes erratic, and blood flow becomes minimal or stops completely. McDaniel et. Al. in the paper "Cardiac Safety of Neuromuscular Incapacitating Defensive Devices", Pacing and Clinical Electrophysiology, January 2005, Volume 28, Number 1, provides a conservative reference for estimating the minimum electrical charge necessary to induce VF under conditions similar to those of the disclosed invention. The study was performed to investigate the safety aspects of electrical neuromuscular incapacitation devices commonly used by law enforcement agencies for incapacitating violent suspects. McDaniel measured the response of a series of pigs to multiple, brief (150 μs) electrical pulses applied to the thorax of the animals. In these tests, a threshold charge of 720 μC could induce VF in a 30 kg animal. The barbed darts were placed on the surface of the animal in close proximity to the heart and penetrated enough to bypass the normal insulating barrier of the skin. This results in a body resistance as low as 400 Ohms. In comparison, the U.S. Occupational Safety and Health Agency (OSHA) describes the resistance of wet human skin to be approximately 1000 Ohms.

By comparing the amount of electrical energy contained in a packet sent by a source to the amount received by the load, it can be determined if some other mechanism, such as an external short circuit, or person receiving a shock, has affected the transfer of energy. The transfer can then be interrupted to protect the equipment or personnel. If the period of a current pulse is below the muscle chronaxie, human skeletal or heart muscles will be much less affected by the pulse. The avoidance of a building or equipment fire is also critical, but the level of energy to cause a fire is normally much less than that which would cause cardiac arrest. The disclosed invention monitors and controls these small packets of energy, and thus offers additional safety over what can be provided even by the combination of a circuit breaker and a ground fault interrupter.

There are two primary fault modes that must be detected. The first mode is an in-line or series fault where an abnormal resistance is put in series with the path between the source and load as is illustrated by the individual being shocked in FIG. 4a. The second fault mode is a cross-line or parallel fault as is illustrated in FIG. 4b. The in-line fault can be detected by an abnormal drop in voltage between the source and load points for a given electrical current. The cross line fault is detected by a loss in current between the source and load, due to the shunting of current through the parallel fault element. Both the in-line and cross-line fault settings will require compensation for normal line resistances and leakage currents to avoid false or nuisance shutdown of the power distribution system.

SUMMARY OF THE INVENTION

A block diagram of the present invention is shown in FIG. 1. The power distribution system regulates the transfer of energy from Source 1 to Load 3. Source Controller 5 on the source side closes Disconnect Device 7 and monitors the transfer of a pulse or "packet" of energy to the load side. A Load Controller 9 on the load side communicates the amount of energy received at the load back to the source controller via Communication Link 11. If it is confirmed that the energy received on the load side corresponds to that sent by the source side, another energy packet is sent. If the energy received does not correspond with that sent by the source side, energy transfer is stopped, indicating a system fault or safety hazard.

The energy content of a single packet is kept small, such that if it is not properly delivered, it can not cause damage to equipment, or in its most sensitive setting, harm personnel.

The apparatus of this disclosure can be separated into two sections; the source control system and the load control system. The source control system is comprised of Source Controller 5, voltage and current sensing means that provide inputs to the source controller, and Disconnect Device 7. The load control system is comprised of Load Controller 9 and voltage and current sensing means that provide inputs to the load controller.

In the preferred embodiment, both control systems operate at high speed with response times under 100 ms. In many instances, this will require that Disconnect Device 7 be constructed as a semiconductor based solid-state switch. SCRs, IGBTs or MOSFETs would be some of the possible candidates. The invention of this disclosure is applicable to AC and DC power distribution systems.

BRIEF DESCRIPTION OF THE DRAWINGS

FIG. 4a is a sketch depicting an in-line, or series shock hazard

FIG. 4b is a sketch depicting a cross-line of parallel shock hazard.

DETAILED DESCRIPTION AND OPERATION OF THE PREFERRED EMBODIMENTS

Figure 1:
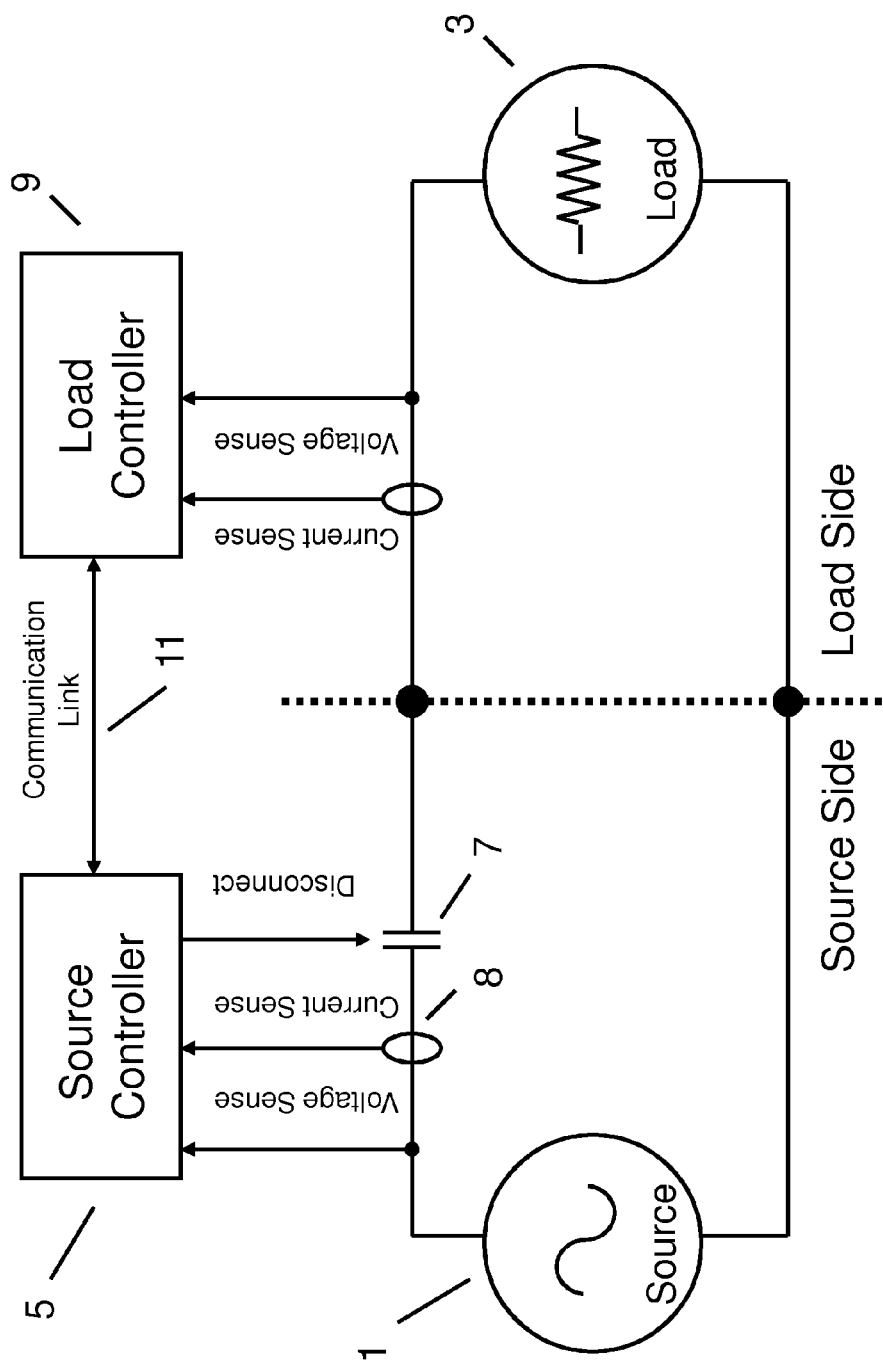
FIG. 1 is a block diagram of the disclosed power distribution system with a disconnect device only on the source side.
Figure 3:
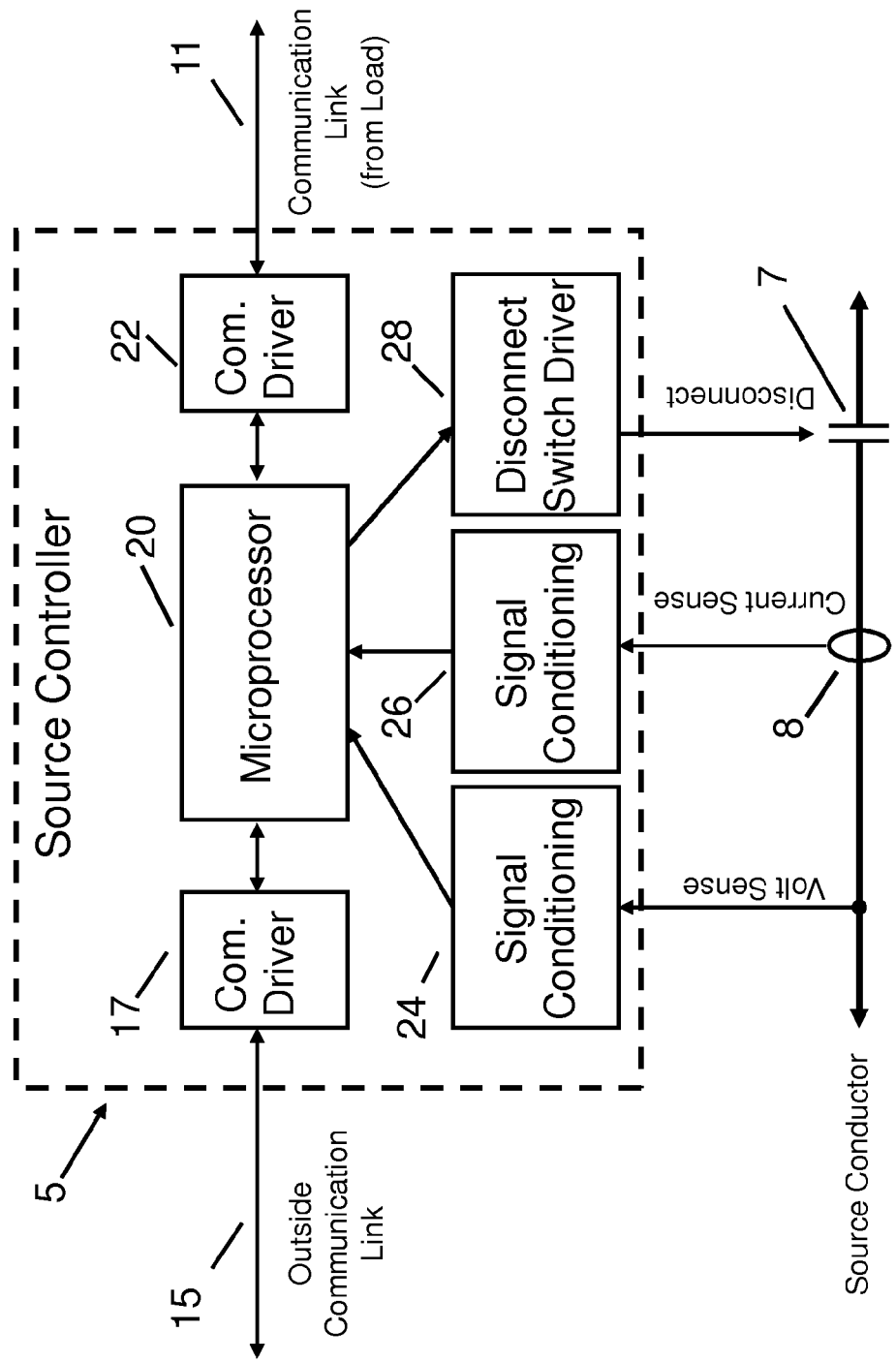
FIG. 3 is a more detailed block diagram of the source controller.

As shown in FIG. 3, the source controller includes Microprocessor 20, Communication Drivers 17, 22 and signal conditioning circuits 24, 26, 28. Referring to FIG. 1, before beginning operation, the following self-check and initialization steps are performed in steps (1)a) through (1)c) below. Source Disconnect 7 remains open during this time.

Initialization a) Source Controller 5 verifies that the source voltage is within a predetermined expected value.

b) Source Controller 5 verifies that there is no current flowing in the source conductor as reported by Current Sensing Means 8. The Source Controller also performs built-in testing algorithms, typical to the industry, to verify that its hardware and firmware is functioning properly.

c) A communication check is performed with Load Controller 9. For systems that provide secured energy transfer, the source controller will request a verification code to ensure that the source and load equipment is electrically compatible, or that the load device is authorized to receive power. Such verification would be necessary for applications where the energy is being purchased for example. The source controller sends a request via Communication Link 11 to the load controller asking it for status. The load controller should respond with the value of voltage and current on its conductors and any fault codes. The source controller verifies that the load voltage is within a predetermined value and that there is no current flowing in the load conductor (indicating a possible failed source disconnect, failed current sensors or other hardware problem). The load controller also performs built-in testing algorithms, typical to the industry, to verify that its hardware and firmware is functioning properly. Any problems in hardware are encoded and sent as a fault code to the source controller.

Energy Transfer d) After the initial verification checks are performed in steps (a) through (c), another measurement is made of the source voltage to determine the maximum fault response time that will be allowed for recognizing a fault and opening the disconnect device in response, assuming a predetermined worst case fault current; for example a body resistance of 400 Ohms. The higher the source voltage, the higher the potential fault current, and hence the shorter the packet period in order to stay safely below the total energy that could cause fire or equipment damage, or in a more sensitive configuration; ventricular fibrillation. In the later case, the voltage measurement is applied to an internal table or function in the source controller processor that is representative of the time-intensity curve of human muscle tissue. The adjustment of response time allows the controller to integrate the sensed voltage and current over a longer period and thus make a more accurate determination of the state of the system while being less sensitive to electrical noise and sensor inaccuracy. To provide additional safety margin, this maximum allowed response time is reduced further to a final value referred to as the "Packet Period" as described in the background section above.

e) The source controller closes Source Disconnect 7 and measures the voltage and current on the source conductors.

f) The source controller reads data from Load Controller 9. If the load controller returns a fault code, the source controller immediately opens the source disconnect.

g) The source controller applies the source voltage measurement to an internal function to determine maximum response time. Based on predetermined internal values for maximum line resistance between the source and the load, the source controller multiplies the source current measurement times the maximum expected line resistance to obtain worst case voltage drop on the line. In other words the worst case voltage drop according to Ohms law is the source current multiplied by the worst case line resistance. If the source voltage minus the load voltage is greater than the maximum voltage drop, then the disconnect device is opened within the packet period.

h) If the line voltage drop is acceptable, then the source current is subtracted from the load current. If the difference is more than a predetermined maximum leakage current, then the disconnect device is opened within the packet period.

i) If steps (g) or (h) above did not result in opening of the disconnect device, then the process continues at step (d)

above. Otherwise if a fault is detected a recovery sequence is initiated as follows:

Recovery Sequence

In the preferred embodiment, the system will allow configuration of either an automatic reset or manual reset. If the system is configured for manual reset, it will remain with the disconnect device open until an outside system or operator initiates a restart. It will then restart operation from step (a). It the system is configured for automatic restart then the following sequences are initiated immediately.

j) The system is initialized according to steps (a) through (c) above.

k) A delay period is implemented to limit stress on equipment or personnel that may still be in contact with the power distribution conductors. In the preferred embodiment, the period is from 1 to 60 seconds.

l) The system continues to step (d) and resumes normal operation if possible.

SUMMARY, RAMIFICATIONS AND SCOPE

The present invention provides a novel power distribution system that can safely transfer energy from a source to a load while overcoming the deficiencies of conventional circuit protection devices and ground fault interrupters.

Figure 2:
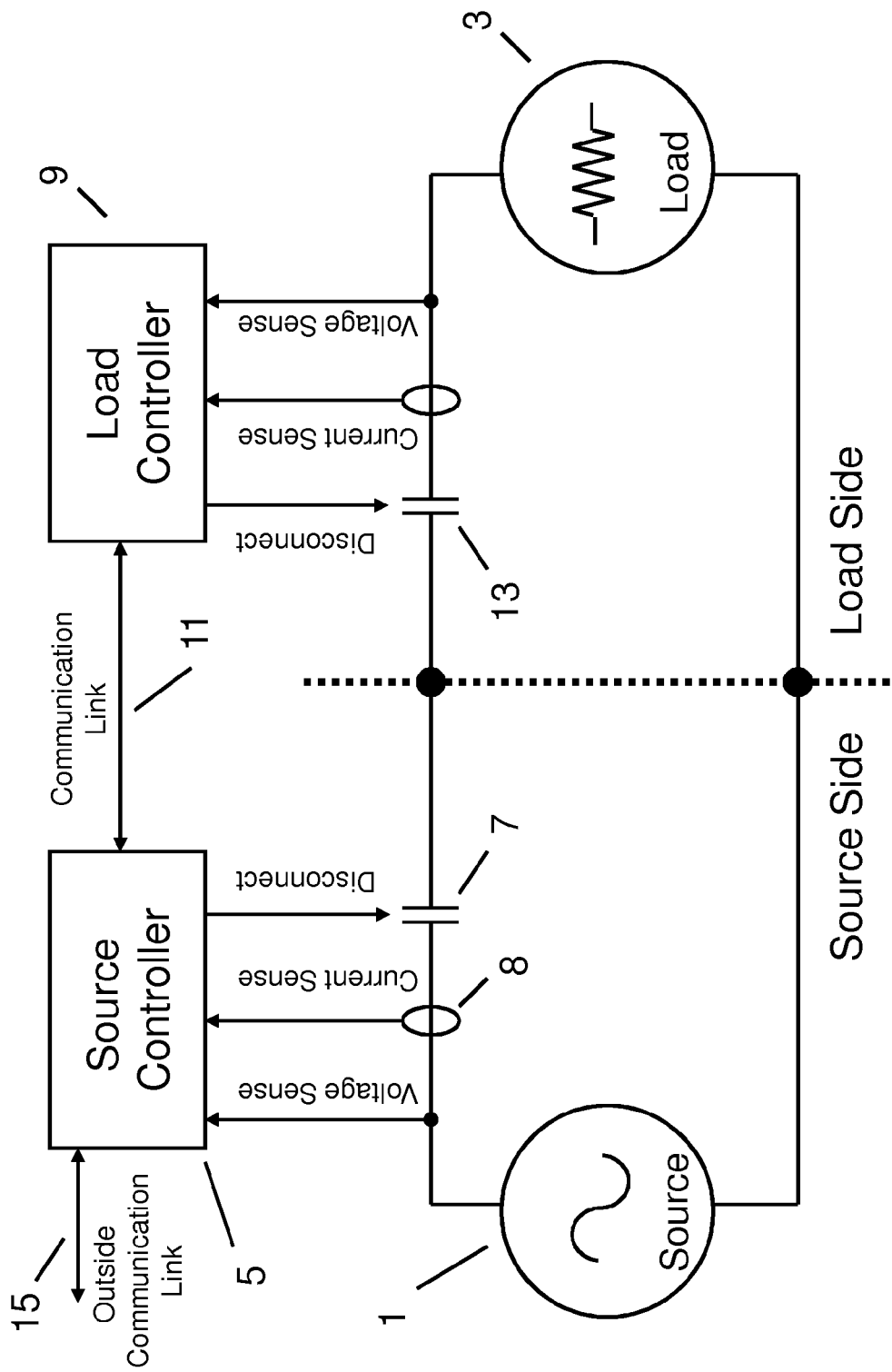
FIG. 2 is a block diagram of the disclosed power distribution system with a disconnect device on the source side and also on the load side.

Referring to FIG. 2, for added protection, some systems may include Load Disconnect Device 13 as part of the load control system. A disconnect device on both the load and source side would be necessary for applications where the load has the ability to become a source of energy as well as a load. An example might be in a "grid connected" application such as a home with an alternative energy sources such as a photovoltaic solar array. At night, the home would act as a load and receive energy from the utility grid, but during the day the home might become a source of generated solar electricity to be sold back to the grid. In such a case, the operation of the system would be essentially the same as what was described above in the detailed description of the preferred embodiment. Since the source and load controllers detect both the magnitude and polarity of the electrical current and voltage within the power distribution system, the source controller would inherently start executing this new mode of operation. For example, as described in the detailed operation section, the voltage drop in the power distribution system conductors is calculated by multiplying the line current by a worst case line resistance. When the load starts supplying power rather than sinking power, the polarity of electrical current will reverse and the line drop calculation will still be valid.

Source Controller 5 and Load Controller 9 could contain a microprocessor, microcontroller, programmable logic device or other suitable digital circuitry for executing control algorithm.

The load controller may take the form of a simple sensor node that collects data relevant to the load side of the system. It does not necessarily require a microprocessor. A single source controller could have multiple voltage and current sensing means assigned to a plurality of load circuits. In this case, the source controller would control a disconnect device for each load circuit and would disconnect those load circuits that fail the predetermined safe operating conditions previously described for the single load circuit case.

Figure 5:
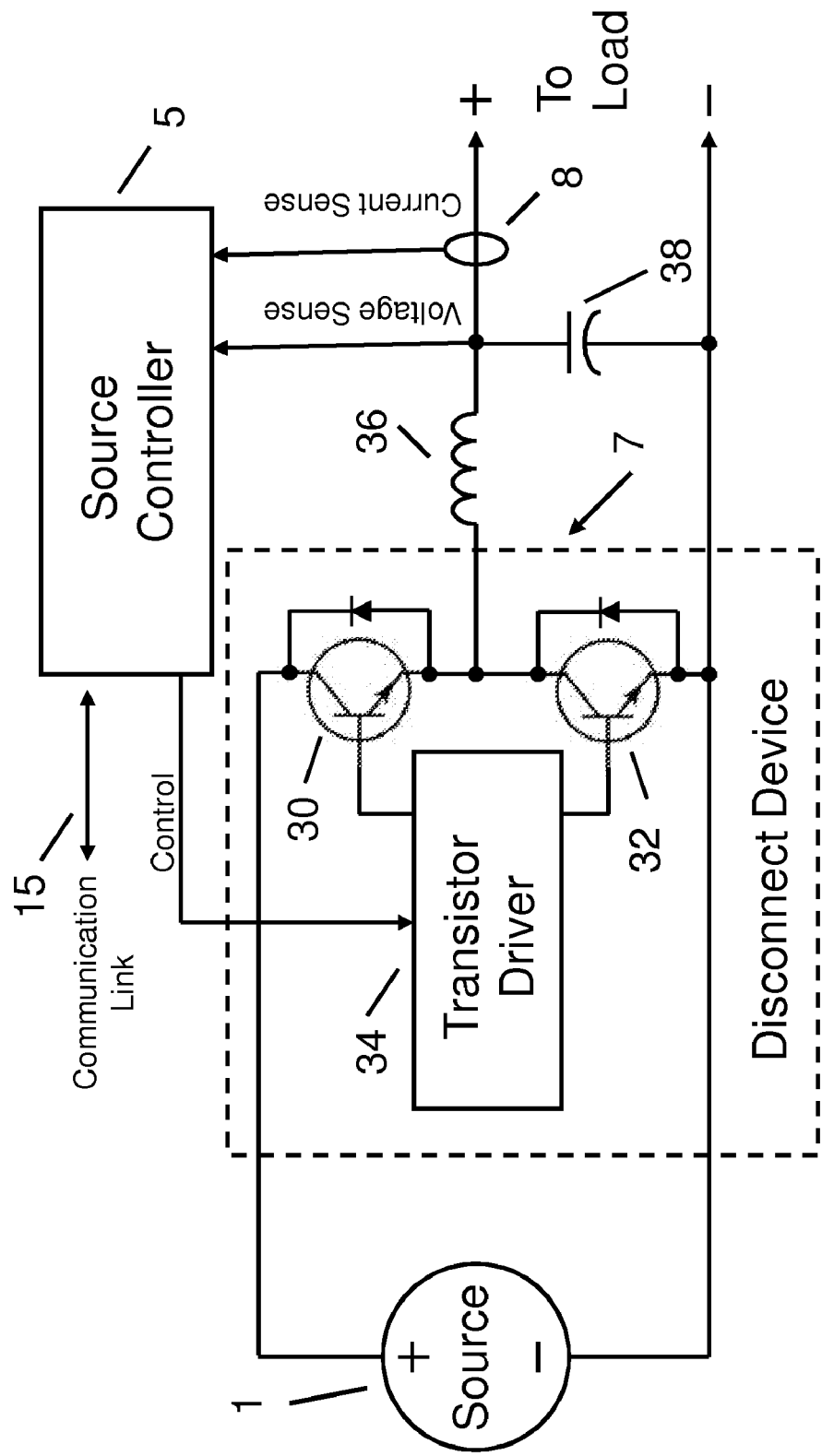
FIG. 5 is a block diagram of the source control system, where the disconnect device is embodies by a high frequency switching circuit.

The function of Disconnect Device 7 could exist as an integral part of an existing power supply unit or charger. FIG. 5 shows one such switching circuit known to those skilled in the art. The circuit includes two switching transistors 30, 32 and transistor driver circuit 34. The driver circuit is in electrical communication with Source Controller 5. The source controller can change the on-time of transistor 30 in relation to transistor 32. The on-time relationship of the transistors can cause the average output voltage from the transistor circuit to vary from zero to nearly the voltage of power source 1. Inductor 36 and capacitor 38 serve to filter the pulsating output of the transistors circuit to a DC value. One advantage of integrating the disconnect function as part of a high frequency switching circuit is the ability of the load controller to send a signal representative of a requested output voltage to the source and have the source generate the request. This could be useful for example during battery charging where the source voltage is varied to regulate the charge rate according to the needs of the battery cells.

The source and load controllers could be used to meter energy transfer and communicate the information back to the user or a remote location. For example, the disclosed invention could be implemented on an electric vehicle public charging station and could be utilized to send electricity consumption back to a central credit card processor. The transfer of information could be through Outside Communication Link 15 as depicted in FIG. 2. A user could also be credited for electricity that is transferred from his electric vehicle and sold to the power grid. The outside communication link could also be used to transfer other operational information. For example, an electric vehicle could have contacts under its chassis that drop down make connection to a charging plate embedded in a rode surface. The communication link could transfer proximity information indicating that the car is over the charging plate. The information could inhibit energizing the charger plate unless the car is properly positioned.

Figure 6:
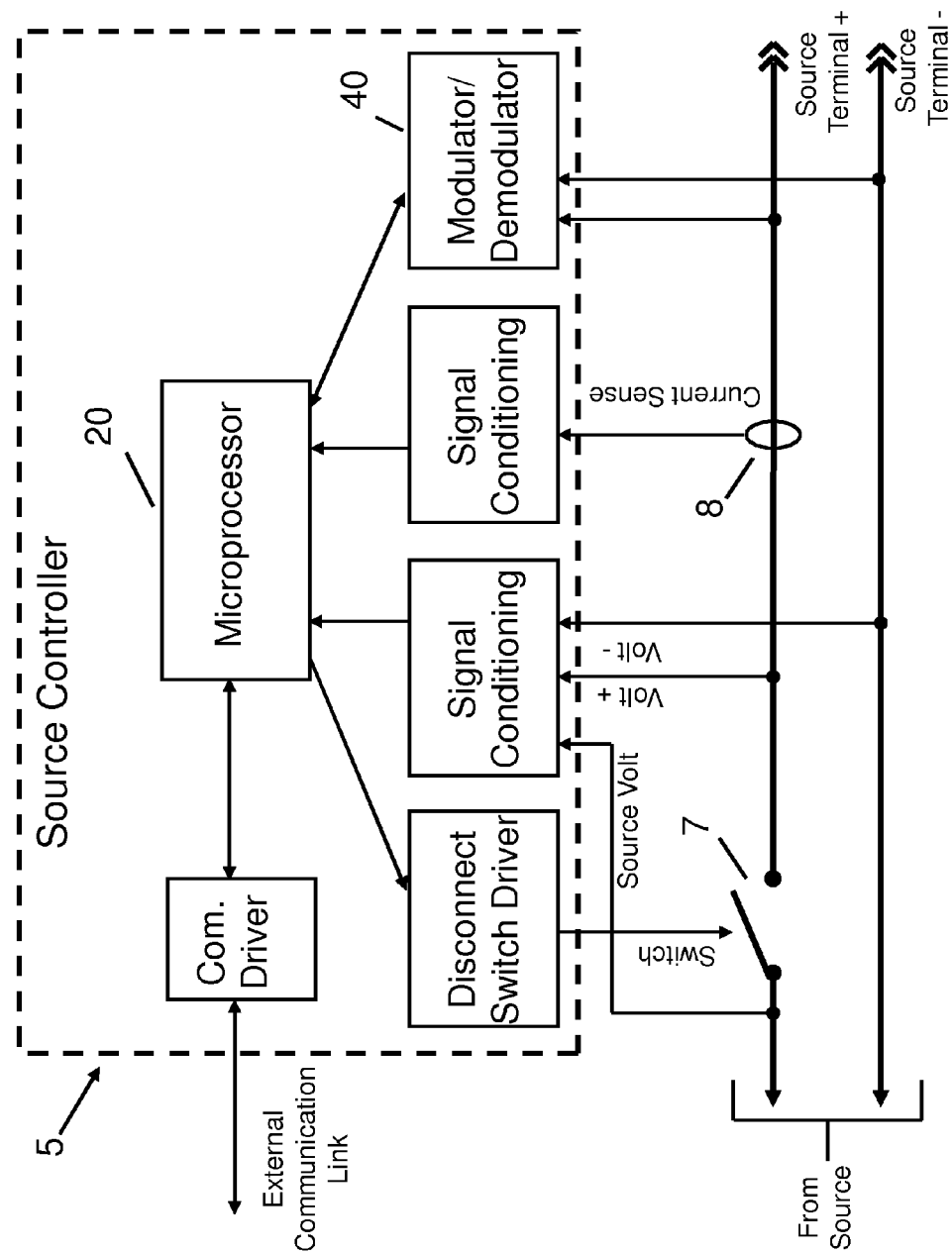
FIG. 6 is a diagram of an alternate source controller configuration that includes a modulator/demodulator means for communications over power lines.

Another option for implementing the functions of Communication Link 11 and/or Outside Communication Link 15 of FIG. 3 would be what is referred to those skilled in the art as "communication over power lines", or "communication or power line carrier" (PLC), also known as "Power line Digital Subscriber Line" (PDSL), "mains communication", or "Broadband over Power Lines" (BPL). Referring to the revised source controller of FIG. 6, communication signals generated by microprocessor 20 are superimposed on the source terminals using modulator/demodulator means 40. The hardware and software methods of modulator/demodulator 40 are well known to those skilled in the art. Although the source controller is used as an example, an identical implementation of the modulator/demodulator means would be contained in the load controller, allowing bidirectional communication between the source and load controller. The transmitting side, either the source or load, would combine the communication signals with the power waveform on the source or load terminals. The receiving side, either the source of the load, would then separate the communication signals from the power waveform.

Thus the scope of the disclosed invention should be determined by the appended claims and their legal equivalents, rather than the examples given.

I claim:

1. A power distribution system for regulating the transfer of energy from a source to a load comprising:

a) source controller means on the source side of said power distribution system with communication to source sensing means that provides feedback to the source controller that includes at least a signal indicative of the current passing through a source conductor;

b) source disconnect device means responsive to a control signal from the source controller for electrically connecting or disconnecting the source from the load circuits;

c) load controller means with communication to load sensing means, where the load sensing means provides feedback to the load controller that includes at least a signal indicative of the current passing through a load circuit conductor;

d) data communication means for the exchange of operating information between the source controller and load controller;

e) logic means implemented in at least the source controller for determining, based on a predetermined set of conditions that include at least the difference between electrical current measured on the source side of the system and the electrical current measured on the load side of the system exceeding a predetermined maximum value if energy should be transferred from the source to the load, or if the source disconnect device should be opened to interrupt energy transfer.

2. The power distribution system of claim 1 where the source disconnect device is embodied by a high frequency switching circuit means capable of continuously regulating the output power to the load in response to a control signal from the source controller means.

3. The power distribution system of claim 1 where the load includes a load disconnect device means responsive to a control signal from the load controller for electrically connecting or disconnecting the load from the source.

4. The power distribution system of claim 1 where the sensing means for the source controller and the sensing means for the load controller includes the ability to acquire a signal indicative of the voltage between at least two conductors on the source and two conductors on the load side of the distribution system and opens the source disconnect device if the difference between the acquired signals is higher than a predetermined maximum value.

5. The method of claim 4 where the predetermined maximum value for voltage difference between the source and load is based at least partially on the electrical current flowing between the source and the load.

6. The power distribution system of claim 1 where the source controller compares the difference in electrical current passing through at least one source conductor to the electrical current passing through at least one load conductor and initiates the disconnect of the source from the load based upon the difference exceeding a predetermined value that is selected at least partially on avoiding ventricular fibrillation in an individual that may have come in electrical contact with one or more power distribution system conductors.

7. The power distribution system of claim 1 where the data communication means is comprised of wireless communication circuits.

8. The power distribution system of claim 1 where the data communication means is accomplished by superimposing communication signals on the power distribution system conductors.

9. The power distribution system of claim 1 where the source and load controller exchange a digital verification code that must match a predetermined value before energy transfer can be initiated.

10. The power distribution system of claim 1 where the source controller includes an external communication interface means for providing information to an external system and where the information provides at least a value indicative of the electrical energy being transferred between the source and the load.

11. The power distribution system of claim 1 where the load side includes a load disconnect device means responsive to a control signal from the load controller for electrically connecting or disconnecting the load from the source, and where the load controller will initiate a disconnect at least in part upon not receiving acceptable operational or verification data from the source controller.

12. The power distribution system of claim 1 where the ratio of on-time to off-time of at least the source disconnect device means can be modulated by the source controller such that the average voltage output from the source to the load can be continuously varied.

13. A method for regulating the safe transfer of energy between a power source and a load comprising:
   a) measuring variables indicative of the operating state of the source that include at least the electrical current passing through one or more source conductors and the voltage between two or more source conductors;
   b) measuring variables indicative of the operating state of the load that include at least the electrical current passing through one or more load conductors, and the voltage between two or more load conductors;
   c) comparing the source current measurement to the load current measurement, and disconnecting the source from the load if the difference exceeds a predetermined maximum value;
   d) calculating the difference between the source voltage measurement and the load voltage measurement and disconnecting the source from the load if the voltage difference exceeds a predetermined maximum value.

14. The method of claim 13 where the predetermined maximum value for the voltage difference between the source and the load is based at least partially on the electrical current flowing between the source and the load.

15. The method of claim 13 where the predetermined maximum value for the difference between the source current measurement and the load current measurement is determined at least partially on avoiding ventricular fibrillation in an individual that may have come in electrical contact with a power distribution system conductor.

16. The method of claim 13 where the predetermined maximum value for the difference between the source voltage measurement and the load voltage measurement is based at least partially on the electrical current flowing between the source and the load.

17. A method for regulating the safe transfer of energy between a power source and a load comprising:
   a) operating a first controller to measure variables on the source side of the system that are indicative of the operating state of the source that include at least the electrical current passing through one or more source conductors;
   b) operating a second controller to measure variables on the load side of the system that are indicative of the operating state of the load that include at least the electrical current passing through one or more load conductors;
   c) transferring the variables acquired by the load controller to the source controller;
   d) inputting the load variables and source variables to a predetermined numerical algorithm resident in the source controller that distinguishes normal power distribution system operation from abnormal operation based on conditions that include at least a difference between electrical current leaving the source side of the system and entering the load side of the system exceeding a predetermined maximum value.

18. The method of claim 17 where the variables measured by the source and load controller include the voltage between two or more source conductors and the voltage between two or more load conductors and where the predetermined numerical algorithm distinguishes a fault as a difference between the source and the load voltage measurements that exceeds a predetermined maximum value.

19. The method of claim 18 where the predetermined maximum value for the difference between the source and the load voltage measurements is based at least partially on the electrical current flowing between the source and the load.

20. The method of claim 17 where the predetermined maximum value for the difference between the electrical current leaving the source side and the electrical current entering the load side of the system is determined at least partially on avoiding ventricular fibrillation in an individual that may have come in electrical contact with a power distribution system conductor.

21. The method of claim 17 where the source and load controllers exchange a digital verification code that must match a predetermined value before energy transfer can be initiated.

* * * * *